(12) United States Patent
Kim et al.

(10) Patent No.: US 12,502,793 B2
(45) Date of Patent: Dec. 23, 2025

(54) DIFFERENTIAL JOINT DEVICE FOR ROBOT, AND METHOD FOR DIAGNOSING STATE OF DIFFERENTIAL JOINT DEVICE FOR ROBOT

(71) Applicant: SAMSUNG ELECTRONICS CO., LTD., Suwon-si (KR)

(72) Inventors: Jinwoong Kim, Suwon-si (KR); Cheoggyu Hwang, Suwon-si (KR); Jinsoo Jeong, Suwon-si (KR); Jinho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 333 days.

(21) Appl. No.: 18/223,189

(22) Filed: Jul. 18, 2023

(65) Prior Publication Data
US 2023/0356417 A1   Nov. 9, 2023

Related U.S. Application Data

(63) Continuation of application No. PCT/KR2021/019260, filed on Dec. 17, 2021.

(30) Foreign Application Priority Data

Jan. 27, 2021   (KR) .................. 10-2021-0011741

(51) Int. Cl.
*B25J 17/00* (2006.01)
*B25J 19/00* (2006.01)
*B25J 19/06* (2006.01)

(52) U.S. Cl.
CPC ........... *B25J 17/00* (2013.01); *B25J 19/0095* (2013.01); *B25J 19/061* (2013.01)

(58) Field of Classification Search
CPC ... A61B 34/30; A61B 34/37; A61B 2034/305; A61B 34/71; A61B 34/77;
(Continued)

(56) References Cited

U.S. PATENT DOCUMENTS 8,366,560 B2   2/2013   Lee et al.
8,380,351 B2   2/2013   Okuda et al.
(Continued)

FOREIGN PATENT DOCUMENTS

CN   109623878 A   4/2019
JP   2009-297809 A   12/2009
(Continued)

OTHER PUBLICATIONS

Communication dated Mar. 29, 2022, issued by the International Searching Authority in counterpart International Application No. PCT/KR2021/019260 (PCT/ISA/210).
(Continued)

*Primary Examiner* — Antony M Paul
(74) *Attorney, Agent, or Firm* — Sughrue Mion, PLLC

(57) ABSTRACT

A differential joint device for a robot includes a first shaft extending in a first direction, a second shaft connected to the first shaft and extending in a second direction vertical to the first direction, a first friction wheel rotatably disposed on one side of the first shaft, a second friction wheel rotatably disposed on another side of the first shaft, a third friction wheel rotatably disposed at one end of the second shaft, the third friction wheel being in contact with the first friction wheel and the second friction wheel, a pitch output encoder disposed to detect a rotation angle of the first shaft, a roll output encoder disposed to detect a rotation angle of the third friction wheel, a first driver configured to rotate the first friction wheel, and a second driver configured to rotate the second friction wheel.

14 Claims, 12 Drawing Sheets

(58) Field of Classification Search
CPC .......... A61B 2090/064; A61B 1/00149; A61B 2034/2059; A61B 2090/066; A61B 34/70; A61B 90/50; A61B 34/76; A61B 2017/00477; B25J 13/00; B25J 13/088; B25J 17/00; B25J 13/085; B25J 17/0258; B25J 9/1674; B25J 17/0283; B25J 3/04; B25J 18/04; B25J 9/10; B25J 9/1641; B25J 9/04; B25J 19/0095; B25J 19/061; G05B 2219/40201; G05B 2219/40586
USPC ...... 901/28, 32, 30, 25; 318/568.11, 568.12, 318/568.2, 568.22, 568.16
See application file for complete search history.

(56) References Cited

U.S. PATENT DOCUMENTS

| | | |
|---|---|---|
| 9,140,344 B2 | 9/2015 | Teng et al. |
| 9,348,331 B2 | 5/2016 | Ishikawa et al. |
| 9,643,317 B2 | 5/2017 | Yajima et al. |
| 9,815,202 B2 | 11/2017 | Osaka et al. |
| 10,363,660 B2 | 7/2019 | Yajima et al. |
| 11,345,024 B2 | 5/2022 | Yajima et al. |
| 2011/0296944 A1 | 12/2011 | Carter et al. |
| 2019/0001501 A1* | 1/2019 | Roberts .................. B25J 13/088 |

FOREIGN PATENT DOCUMENTS

| | | |
|---|---|---|
| JP | 6164948 B2 | 7/2017 |
| JP | 2020-104177 A | 7/2020 |
| KR | 10-2006-0111211 A | 10/2006 |
| KR | 10-0987087 B1 | 10/2010 |
| KR | 10-2011-0075728 A | 7/2011 |
| KR | 10-1691941 B1 | 1/2017 |
| WO | 2010/127701 A1 | 11/2010 |
| WO | 2019/150812 A1 | 8/2019 |

OTHER PUBLICATIONS

Communication dated Mar. 29, 2022, issued by the International Searching Authority in counterpart International Application No. PCT/KR2021/019260 (PCT/ISA/237).

* cited by examiner

DIFFERENTIAL JOINT DEVICE FOR ROBOT, AND METHOD FOR DIAGNOSING STATE OF DIFFERENTIAL JOINT DEVICE FOR ROBOT

CROSS-REFERENCE TO RELATED APPLICATION

This application is a bypass continuation application of International Application No. PCT/KR2021/019260, filed on Dec. 17, 2021, which is based on and claims priority to Korean Patent Application No. 10-2021-0011741, filed on Jan. 27, 2021, in the Korean Intellectual Property Office, the disclosures of which are incorporated by reference herein in their entireties.

BACKGROUND

1. Field

The disclosure relates to a differential joint device for a robot, and more particularly, to a differential joint device for a robot having a torque limit function and a method for diagnosing a state of the differential joint device for the robot.

2. Description of Related Art

Multi joint robots capable of performing various motions are widely used.

While the robot is working, the robot may collide with other objects such as structures, workpieces, etc. around the robot. When the robot collides with an external object during work, an unexpected external force may act on the robot.

When the robot receives an excessive external force due to a collision, etc., the power transmission system of the robot may be damaged.

In addition, when a person or an object collides with the robot in operation, there is a risk of a safety accident in which the person is injured or the object is damaged.

Therefore, in order to prevent such safety accidents, various methods of detecting a torque acting on the joints of the robot and controlling the robot according to the detected torque are being studied.

Methods for detecting the external torque acting on the joints of the robot include a method of measuring the external torque using a torque sensor, a method of detecting the external torque by measuring the current acting on the motor, a method of using a torque limiter to loosen the joints of the robot when a predetermined amount of external torque is applied, and the like.

Among them, the torque limiter that mechanically responds to external torque has an advantage of being fast in terms of reaction speed, but has a problem in that the joints become large.

In addition, the torque limiter according to the related art is only applied to a single axis joint, and the torque limiter is not applied to a differential joint device used as a compact wrist joint.

The disclosure has been developed in order to overcome the above drawbacks and other problems associated with the conventional arrangement. An aspect of the disclosure is to provide a differential joint device for a robot having a torque limiter function implemented by a friction wheel and an encoder and a method for diagnosing a state of the differential joint device for a robot.

SUMMARY

According to an aspect of the disclosure, a differential joint device for a robot includes a first shaft extending in a first direction, a second shaft connected to the first shaft and extending in a second direction vertical to the first direction, a first friction wheel rotatably disposed on one side of the first shaft, a second friction wheel rotatably disposed on another side of the first shaft, a third friction wheel rotatably disposed at one end of the second shaft, the third friction wheel being in contact with the first friction wheel and the second friction wheel, a pitch output encoder disposed to detect a rotation angle of the first shaft, a roll output encoder disposed to detect a rotation angle of the third friction wheel, a first driver configured to rotate the first friction wheel, and a second driver configured to rotate the second friction wheel.

The first driver may include a first motor, a first encoder configured to detect a rotation angle of the first motor, and a first power transmitter configured to transmit rotation of the first motor to the first friction wheel. The second driver may include a second motor, a second encoder configured to detect a rotation angle of the second motor, and a second power transmitter configured to transmit rotation of the second motor to the second friction wheel.

Each of the first power transmitter and the second power transmitter may include a gear power transmitter and a belt power transmitter.

The differential joint device for a robot may further include a pitch output error detection part configured to identify a difference value between an actual output value of the pitch output encoder and an expected output value of the pitch output encoder.

The expected output value of the pitch output encoder may be calculated by a following formula:

> The expected output value of the pitch output encoder=½×reduction ratio×(rotation angle of the first encoder+rotation angle of the second encoder).

The differential joint device for a robot may further include a processor configured to identify the expected output value of the pitch output encoder. The processor may be further configured to output an alarm to an outside based on the difference value between the actual output value of the pitch output encoder and the expected output value of the pitch output encoder exceeding a pitch reference error.

The differential joint device for a robot may further include a roll output error detection part configured to calculate a difference value between an actual output value of the roll output encoder and an expected output value of the roll output encoder.

The expected output value of the roll output encoder may be calculated by a following formula:

> The expected output value of the roll output encoder=½×friction wheel reduction ratio×reduction ratio×(rotation angle of the first encoder−rotation angle of the second encoder).

The differential joint device for a robot may further include a processor configured to identify the expected output value of the roll output encoder. The processor may be further configured to output an alarm to an outside based on the difference value between the actual output value of the roll output encoder and the expected output value of the roll output encoder exceeding a roll reference error.

Each of the first friction wheel, the second friction wheel, and the third friction wheel may be formed as a cone friction wheel.

The differential joint device for a robot may further include an encoder shaft disposed in parallel with the second shaft and formed to rotate in the same manner as the third friction wheel. The roll output encoder may be disposed to detect a rotation angle of the encoder shaft.

The differential joint device for a robot may further include a first encoder pulley disposed at one end of the third friction wheel facing the first shaft, a second encoder pulley disposed at one end of the encoder shaft, an encoder belt disposed to transmit rotation of the first encoder pulley to the second encoder pulley, and a magnet disposed on another end of the encoder shaft.

The differential joint device for a robot may further include a first friction force adjuster configured to adjust a frictional force between the first friction wheel and the third friction wheel, and a second friction force adjuster configured to adjust a frictional force between the second friction wheel and the third friction wheel.

Each of the first friction force adjuster and the second friction force adjuster may include a pressing member disposed at the first shaft and pressing the first friction wheel or the second friction wheel toward the third friction wheel, a screw part provided at one end of the first shaft, and an adjusting nut fastened to the screw part of the first shaft.

According to another aspect of the disclosure, a method for diagnosing a state of a differential joint device for a robot includes identifying an expected output value of a pitch output encoder and an expected output value of a roll output encoder, detecting an actual output value of the pitch output encoder and an actual output value of the roll output encoder, identifying a difference value between the expected output value and the actual output value of the pitch output encoder and a difference value between the expected output value and the actual output value of the roll output encoder, comparing the difference value of the pitch output encoder with a pitch reference error and comparing the difference value of the roll output encoder with a roll reference error, outputting an alarm based on the difference value of the pitch output encoder being equal to or greater than the pitch reference error or the difference value of the roll output encoder being equal to or greater than the roll reference error, and compensating for the difference value of the pitch output encoder based on the difference value of the pitch output encoder being smaller than the pitch reference error and compensating for the difference value of the roll output encoder based on the difference value of the roll output encoder being smaller than the roll reference error.

The compensating for the difference value of the pitch output encoder may include controlling a first motor and a second motor so that the expected output value of the pitch output encoder coincides with the actual output value of the pitch output encoder.

The compensating for the difference value of the roll output encoder may include controlling a first motor and a second motor so that the expected output value of the roll output encoder coincides with the actual output value of the roll output encoder.

The outputting the alarm may include identifying whether a recovery signal is input, and based on the recovery signal being input, recovering a position of the differential joint device based on an output value of the pitch output encoder and an output value of the roll output encoder.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Various embodiments described below are shown by way of example to assist understanding of the disclosure, and it should be understood that the disclosure may be variously modified and implemented differently from the embodiments described herein. However, in the following description of the disclosure, when it is determined that a detailed description of a related known function or components may unnecessarily obscure the gist of the disclosure, the detailed description and specific illustration thereof will be omitted. Further, in the accompanying drawings, the dimensions of some components may be arbitrarily exaggerated and not drawn to scale in order to aid understanding of the disclosure.

The terms 'first', 'second', etc. may be used to describe diverse components, but the components are not limited by the terms. The terms may only be used to distinguish one component from the others. For example, without departing from the scope of the disclosure, a first component may be referred to as a second component, and similarly, a second component may also be referred to as a first component.

The terms used in embodiments of the disclosure may be construed as commonly known to those skilled in the art unless otherwise defined.

Further, the terms 'leading end', 'rear end', 'upper side', 'lower side', 'top end', 'bottom end', etc. used in the disclosure are defined with reference to the drawings. However, the shape and position of each component are not limited by the terms.

Hereinafter, a differential joint device for a robot according to an embodiment of the disclosure will be described in detail with reference to the accompanying drawings.

Figure 1:
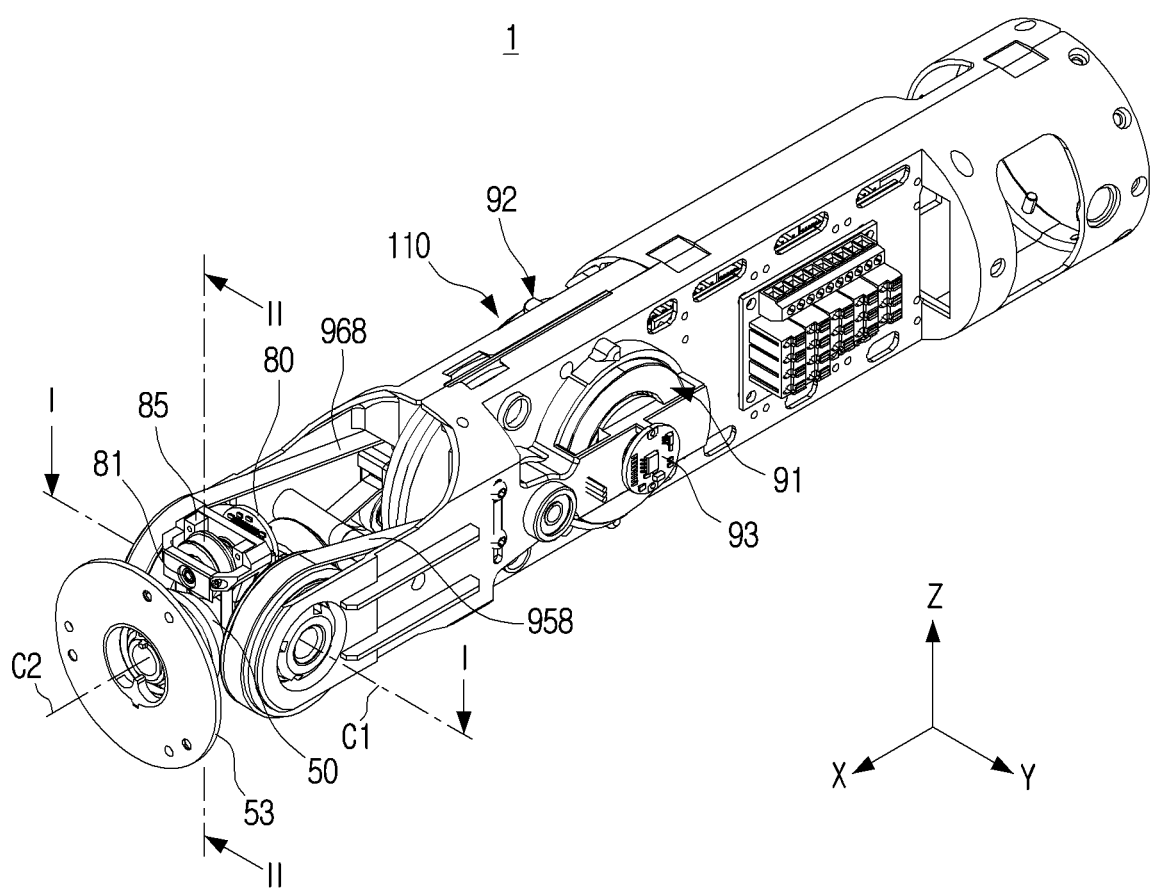
FIG. 1 is a perspective view illustrating a differential joint device for a robot according to an embodiment of the disclosure.
Figure 2:
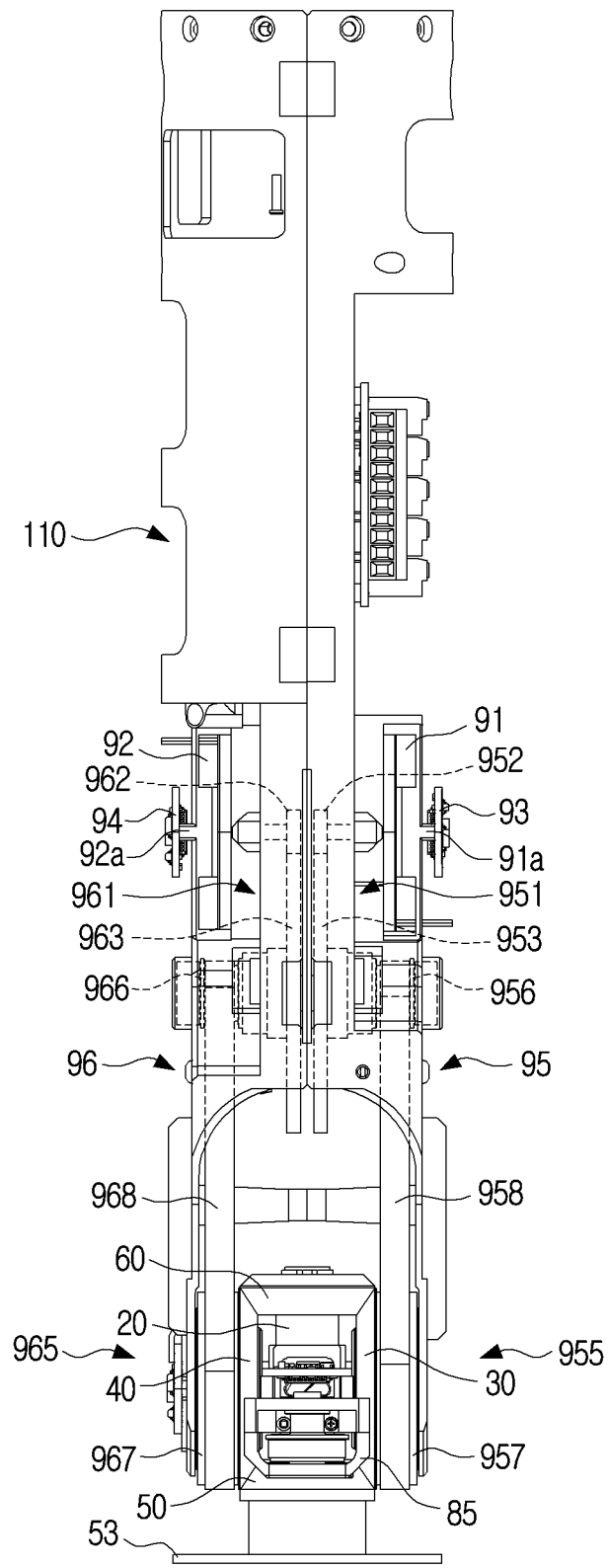
FIG. 2 is a plan view illustrating a differential joint device for a robot according to an embodiment of the disclosure.
Figure 3:
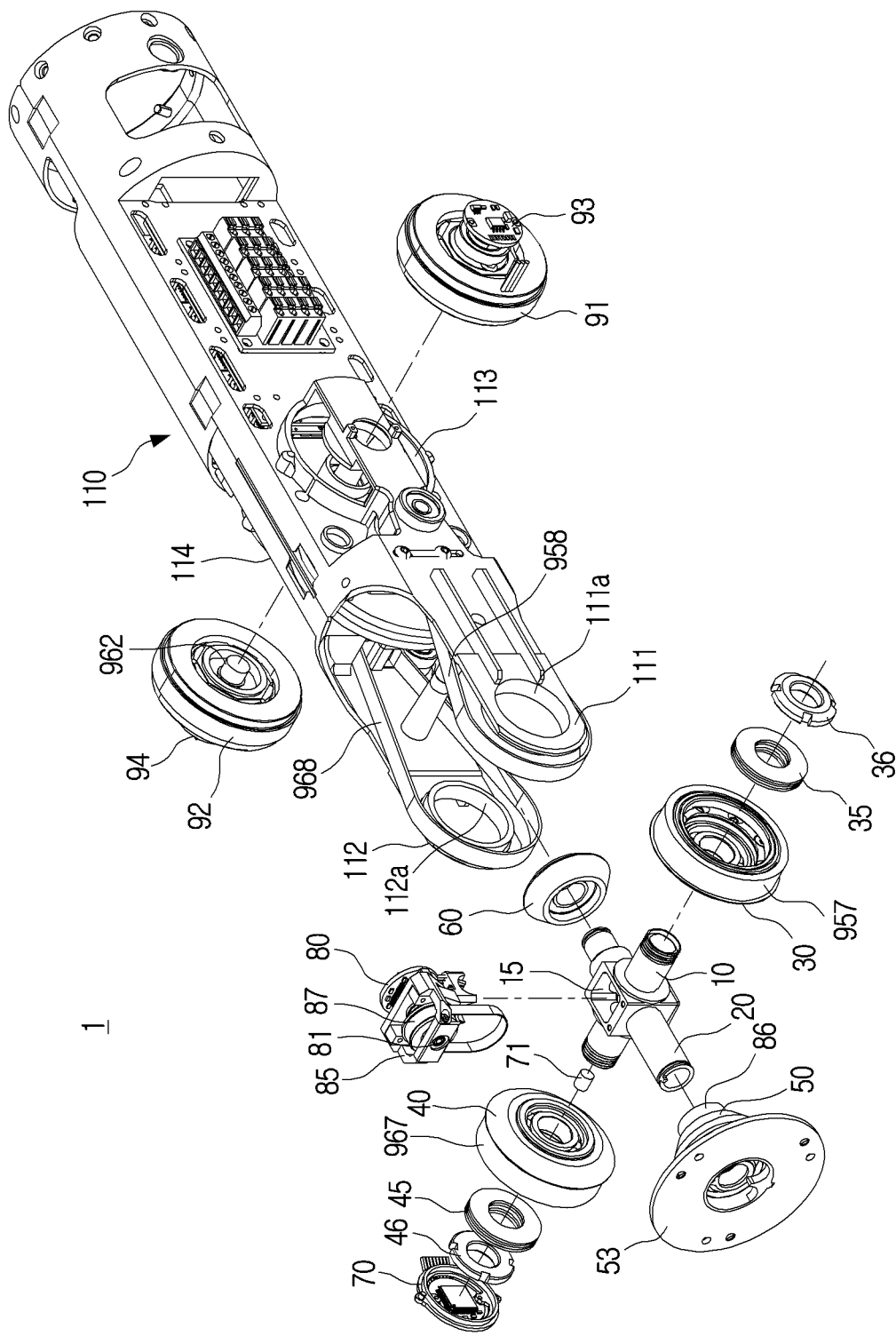
FIG. 3 is an exploded perspective view illustrating a differential joint device for a robot according to an embodiment of the disclosure.
Figure 4:
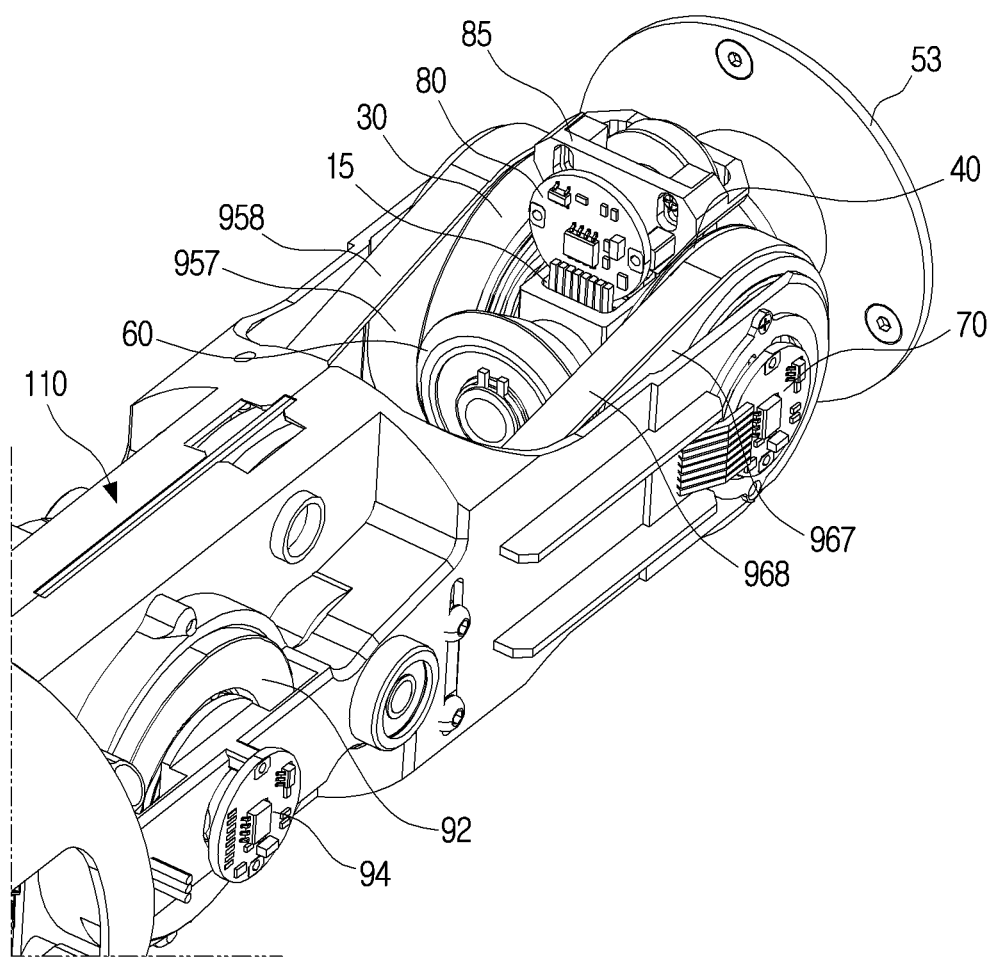
FIG. 4 is a perspective view of the differential joint device for the robot of FIG. 1 viewed from the opposite direction.
Figure 5:
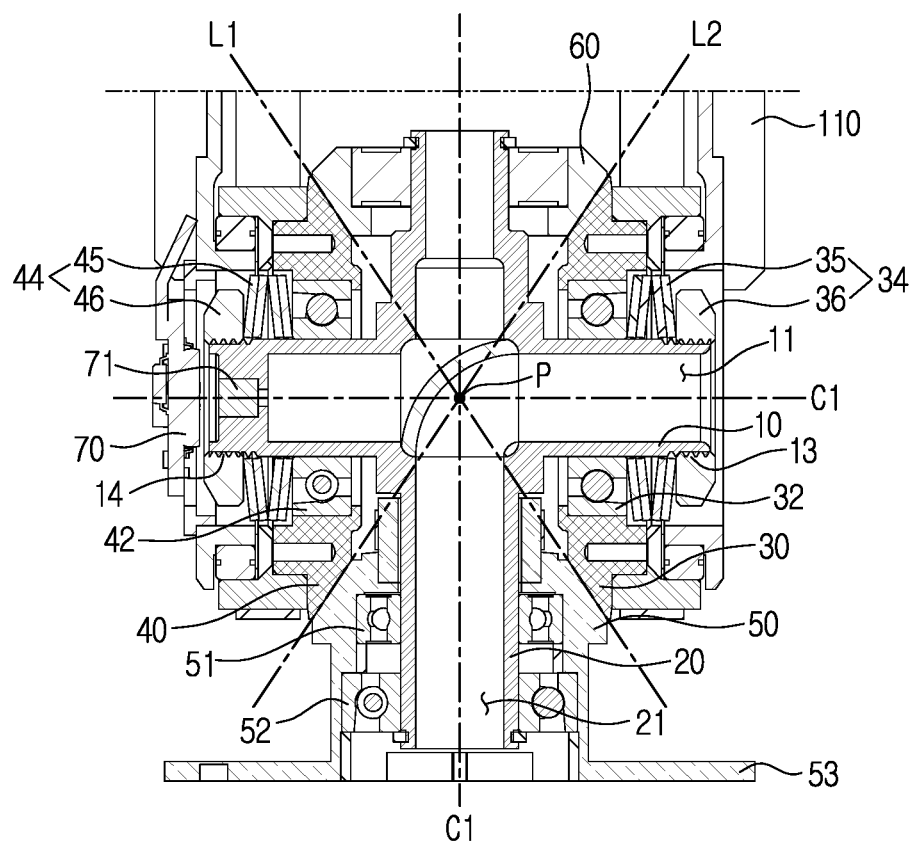
FIG. 5 is a partial cross-sectional view illustrating the differential joint device for a robot of FIG. 1 taken along line I-I.
Figure 6:
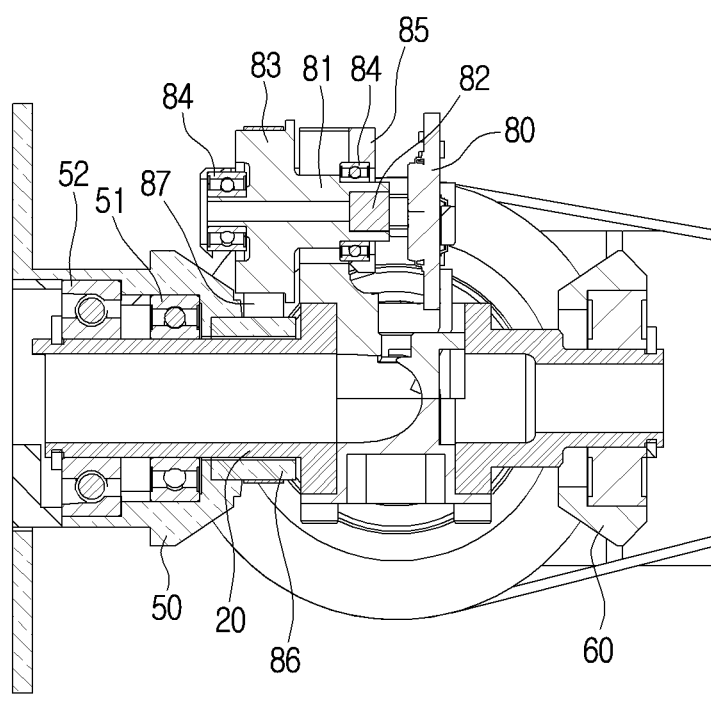
FIG. 6 is a partial cross-sectional view illustrating the differential joint device for a robot of FIG. 1 taken along line II-II.

FIG. 1 is a perspective view illustrating a differential joint device for a robot according to an embodiment of the disclosure. FIG. 2 is a plan view illustrating a differential joint device for a robot according to an embodiment of the disclosure. FIG. 3 is an exploded perspective view illustrating a differential joint device for a robot according to an embodiment of the disclosure. FIG. 4 is a perspective view of the differential joint device for the robot of FIG. 1 viewed from the opposite direction. FIG. 5 is a partial cross-sectional view illustrating the differential joint device for a robot of FIG. 1 taken along line I-I. FIG. 6 is a partial cross-sectional view illustrating the differential joint device for a robot of FIG. 1 taken along line II-II.

Referring to FIGS. 1 to 6, a differential joint device 1 for a robot according to an embodiment of the disclosure may include a first shaft 10, a second shaft 20, a first friction wheel 30, a second friction wheel 40, a third friction wheel 50, a fourth friction wheel 60, a pitch output encoder 70, a roll output encoder 80, a first motor 91, and a second motor 92.

The first shaft 10 may be formed in a hollow cylindrical shape. The first shaft 10 may rotatably support the first friction wheel 30 and the second friction wheel 40 facing each other. Accordingly, the first friction wheel 30 and the second friction wheel 40 may rotate around the first shaft 10. In other words, the first friction wheel 30 and the second friction wheel 40 may rotate around the same rotational axis, that is, the center axis C1 of the first shaft 10.

The first shaft 10 may be disposed parallel to the Y-axis. In other words, the rotation axes of the first friction wheel 30 and the second friction wheel 40 may be parallel to the Y-axis.

Screw parts to which nuts are fastened may be provided at both ends of the first shaft 10.

The second shaft 20 may be formed in a hollow cylindrical shape. The third friction wheel 50 may be rotatably disposed at one end of the second shaft 20. Accordingly, the third friction wheel 50 may rotate around the second shaft 20.

In addition, the fourth friction wheel 60 may be rotatably disposed at the other end of the second shaft 20. Accordingly, the fourth friction wheel 60 may rotate around the second shaft 20. Accordingly, the third friction wheel 50 and the fourth friction wheel 60 may rotate around the same rotational axis, that is, the central axis C2 of the second shaft 20.

The second shaft 20 may be disposed perpendicular to the first shaft 10. In detail, the second shaft 20 may be formed to extend vertically from the first shaft 10. In other words, the first shaft 10 and the second shaft 20 may be formed so that the central axis C1 of the first shaft 10 and the central axis C2 of the second shaft 20 intersect on the same plane.

In other words, the second shaft 20 may be disposed parallel to the X-axis. That is, the rotational axes of the third friction wheel 50 and the fourth friction wheel 60 may be parallel to the X-axis.

The second shaft 20 and the first shaft 10 may be integrally formed. For example, the first shaft 10 and the second shaft 20 may be formed as a single shaft having a cross shape. The first to fourth friction wheels 30, 40, 50, and 60 may be rotatably disposed at four ends of the cross-shaped shaft. Alternatively, after forming the first shaft 10 and the second shaft 20 separately, the first shaft 10 and the second shaft 20 may be assembled to form a cross-shaped shaft.

An opening 15 communicating with a hollow 11 of the first shaft 10 and a hollow 21 of the second shaft 20 may be provided at the center of the cross-shaped shaft.

The first friction wheel 30 may be disposed to rotate while being inserted into the first shaft 10. The first friction wheel 30 may have a truncated cone shape. In other words, the first friction wheel 30 may be formed as a cone friction wheel. The first friction wheel 30 may be disposed on the first shaft 10 so that a surface having a small area faces the second shaft 20.

A first bearing 32 may be disposed between the first friction wheel 30 and the first shaft 10. In other words, the first friction wheel 30 is supported by the first bearing 32 so that the first friction wheel 30 may rotate with respect to the first shaft 10.

The second friction wheel 40 may be disposed to rotate while being inserted into the first shaft 10. The second friction wheel 40 may be formed in the same shape as the first friction wheel 30. In detail, the second friction wheel 40 may have a truncated cone shape. In other words, the second friction wheel 40 may be formed as a cone friction wheel.

The second friction wheel 40 may be disposed on the first shaft 10 so that a surface having a small area faces the second shaft 20. That is, the first friction wheel 30 and the second friction wheel 40 may be disposed symmetrically with respect to the second shaft 20.

A second bearing 42 may be disposed between the second friction wheel 40 and the first shaft 10. In other words, the second friction wheel 40 is supported by the second bearing 42 so that the second friction wheel 40 may rotate with respect to the first shaft 10.

The first bearing 32 and the second bearing 42 supporting the rotation of the first friction wheel 30 and the second friction wheel 40 with respect to the first shaft 10 may include angular ball bearings.

The third friction wheel 50 may be rotatably disposed at one end of the second shaft 20. In other words, the third friction wheel 50 may be disposed to rotate while being inserted into the second shaft 20. Accordingly, the third friction wheel 50 may rotate around the central axis C2 of the second shaft 20.

The third friction wheel 50 may have a truncated cone shape. In other words, the third friction wheel 50 may be formed as a cone friction wheel. The third friction wheel 30 may be disposed on the second shaft 20 so that a surface having a small area faces the first shaft 10.

The third friction wheel 50 is disposed so as to be simultaneously in contact with the first friction wheel 30 and the second friction wheel 40 which face each other and are spaced apart from each other. A first portion of the third friction wheel 50 in contact with the first friction wheel 30 and a second portion of the third friction wheel 50 in contact with the second friction wheel 40 are different from each other. Therefore, the third friction wheel 50 may be passively rotated by receiving the rotational forces of the first friction wheel 30 and the second friction wheel 40 by the first frictional force and the second frictional force generated at the first portion and the second portion where the first friction wheel 30 and the second friction wheel 40 are in contact with the third friction wheel 50.

In detail, the inclined surface of the third friction wheel 50 may contact the inclined surface of the first friction wheel 30 and the inclined surface of the second friction wheel 40 at the same time. Therefore, the third friction wheel 50 may contact the first friction wheel 30 along a first straight line L1 and contact the second friction wheel 40 along a second straight line L2. At this time, the first straight line L1 and the second straight line L2 may intersect at the intersection point P at which the central axis C1 of the first shaft 10 and the central axis C2 of the second shaft 20 intersect.

Therefore, the third friction wheel 50 may rotate around the central axis C1 of the first shaft 10 or around the central axis C2 of the second shaft 20 based on the rotational directions of the first friction wheel 30 and the second friction wheel 40.

For example, when the first friction wheel 30 and the second friction wheel 40 rotate in the same direction with respect to the first shaft 10, the third friction wheel 50 receives frictional forces acting in opposite directions by the first friction wheel 30 and the second friction wheel 40, so that the third friction wheel 50 does not rotate around the second shaft 20. At this time, the third friction wheel 50 rotates around the first shaft 10 by the first friction wheel 30 and the second friction wheel 40. In other words, the second shaft 20 on which the third friction wheel 50 is disposed rotates around the central axis C1 of the first shaft 10. Therefore, when the first friction wheel 30 and the second friction wheel 40 rotate in the same direction, the third friction wheel 50 may perform pitch rotation around the central axis C1 of the first shaft 10 together with the second shaft 20.

When the first friction wheel 30 and the second friction wheel 40 rotate in opposite directions with respect to the first shaft 10, the third friction wheel 50 receives frictional forces acting in the same direction by the first friction wheel 30 and the second friction wheel 40, so that the third friction wheel 50 rotates around the second shaft 20. In other words, when the first friction wheel 30 and the second friction wheel 40 rotate in opposite directions, the third friction wheel 50 may perform roll rotation around the central axis C2 of the second shaft 20.

In other words, the third friction wheel 50 passively rotates by receiving the rotational forces of the first friction wheel 30 and the second friction wheel 40, and may perform the pitch rotation and the roll rotation based on the rotating directions of the first friction wheel 30 and the second friction wheel 40. The pitch rotation and roll rotation of the third friction wheel 50 will be described in detail below.

A connection plate 53 may be provided on the front surface of the third friction wheel 50. The connection plate 53 may have a disk shape and be coupled to the third friction wheel 50 to rotate integrally.

Although not illustrated, the connection plate 53 may be connected with one of various parts of the robot. For example, one of various parts of the robot, such as arms, hands, feet, legs, a head, and the like, may be coupled to the connection plate 53 and rotated together with the third friction wheel 50. Alternatively, an accessary for a robot such as a gripper may be disposed on the connection plate 53.

Bearings 51 and 52 may be provided between the third friction wheel 50 and the second shaft 20 so that the third friction wheel 50 may rotate smoothly. In this embodiment, the third friction wheel 50 is configured to be supported by two bearings 51 and 52 disposed on the second shaft 20, but the number of bearings 51 and 52 is not limited thereto. The third friction wheel 50 may be supported by one or three or more bearings.

The bearings 51 and 52 may be formed as an angular ball bearing. However, the types of bearings 51 and 52 are not limited thereto.

The fourth friction wheel 60 may be rotatably disposed at the other end of the second shaft 20. In other words, the fourth friction wheel 60 is disposed to rotate while being inserted into the second shaft 20. Accordingly, the fourth friction wheel 60 may rotate around the central axis C2 of the second shaft 20.

The fourth friction wheel 60 may have a truncated cone shape. In other words, the fourth friction wheel 60 may be formed as a cone friction wheel. The fourth friction wheel 60 may be disposed at the other end of the second shaft 20 so that a surface having a small area faces the first shaft 10.

The fourth friction wheel 60 may have a shape symmetrical to that of the third friction wheel 50 with respect to the first shaft 10. In detail, the fourth friction wheel 60 may be formed to have the same inclined surface as that of the third friction wheel 50.

The fourth friction wheel 60 is disposed on the second shaft 20 at a position facing the third friction wheel 50, and may rotate in the opposite direction to the third friction wheel 50.

Because the third friction wheel 50 and the fourth friction wheel 60 are spaced apart from each other and face each other on the second shaft 20, the third friction wheel 50 and the fourth friction wheel 60 are structured to support the first friction wheel 30 and the second friction wheel 40 at both ends. Therefore, the first friction wheel 30 and the second friction wheel 40 may be stably supported by the third friction wheel 50 and the fourth friction wheel 60.

In this embodiment, the fourth friction wheel 60 is disposed on the second shaft 20. However, the fourth friction wheel 60 may not be disposed on the second shaft 20.

The first to fourth friction wheels 30, 40, 50, and 60 may be formed of light weight metal. For example, the first to fourth friction wheels 30, 40, 50, and 60 may be formed of aluminum or an aluminum alloy. However, the materials of the first to fourth friction wheels 30, 40, 50, and 60 are not limited thereto. By reducing the weight of the first to fourth friction wheels 30, 40, 50, and 60, the weight of the differential joint device 1 for a robot may be reduced. Then, the driving force of the driving source for driving the first friction wheel 30 and the second friction wheel 40 may be lowered.

In addition, because the first to fourth friction wheels 30, 40, 50, and 60 do not have teeth formed on their surfaces and are in continuous contact with each other, they do not have backlash and may rotate smoothly without noise. In addition, the differential joint device 1 for a robot using the friction wheels 30, 40, 50, and 60 as in the disclosure may be less expensive to manufacture than the differential joint device for a robot according to the related art using gears, and may have fewer parts and lower maintenance costs than the differential joint device for a robot according to the related art using wires.

The pitch output encoder 70 may be disposed at one end of the first shaft 10 to detect the rotation angle of the first shaft 10. When the third friction wheel 50 performs pitch rotation by the first friction wheel 30 and the second friction wheel 40, the first shaft 10 rotates. At this time, the pitch output encoder 70 may detect the rotation angle of the first shaft 10. In other words, the pitch output encoder 70 may detect the pitch rotation angle of the third friction wheel 50.

The pitch output encoder 70 may be fixed to a frame 110. The pitch output encoder 70 is disposed to face a magnet 71 that is disposed at the other end of the first shaft 10 and rotates integrally with the first shaft 10. The pitch output encoder 70 may be configured to output a signal corresponding to rotation of the magnet 71 rotating integrally with the first shaft 10.

The pitch output encoder 70 may be electrically connected to a processor 100. Accordingly, the processor 100 may identify the rotation angle of the first shaft 10 using the signal output from the pitch output encoder 70.

The roll output encoder 80 may be disposed to detect rotation angle of the third friction wheel 50. In other words, the roll output encoder 80 may be disposed to detect the rotation angle of the third friction wheel 50 with respect to the central axis C2 of the second shaft 20 and output a signal corresponding to the rotation angle.

For example, the roll output encoder 80 may be disposed to detect rotation angle of an encoder shaft 81 which is disposed in parallel with the second shaft 20 and rotates the same as the third friction wheel 50.

The encoder shaft 81 may be connected to the third friction wheel 50 through a belt 87. Therefore, when the third friction wheel 50 rotates, the encoder shaft 81 may rotate in the same way as the third friction wheel 50.

For example, a second encoder pulley 83 may be disposed at one end of the encoder shaft 81, and a magnet 82 may be disposed at the other end of the encoder shaft 81. The second encoder pulley 83 and the magnet 82 may be disposed to rotate integrally with the encoder shaft 81. The encoder shaft 81 is disposed to be supported at both ends by two bearings 84. The two bearings 84 may be supported by a fixing bracket 85 disposed on the second shaft 20.

The roll output encoder 80 is disposed to face the magnet 82 fixed to the other end of the encoder shaft 81. The roll output encoder 80 is fixed to the fixing bracket 85 disposed on the second shaft 20. Therefore, when the second shaft 20 rotates around the first shaft 10, the roll output encoder 80 rotates integrally with the second shaft 20.

The roll output encoder 80 may be electrically connected to the processor 100. A signal line and a power line may be connected to the roll output encoder 80 through the opening 15 of the second shaft 20 and the hollow 11 of the first shaft 10.

A first encoder pulley 86 may be disposed at one end of the third friction wheel 50 facing the first shaft 10. In other words, the second shaft 20 may be inserted into the first encoder pulley 86, and the first encoder pulley 86 may be disposed to rotate integrally with the third friction wheel 50.

The first encoder pulley 86 and the second encoder pulley 83 are connected by the encoder belt 87. Accordingly, rotation of the first encoder pulley 86 may be transmitted to the second encoder pulley 83. Because the first encoder pulley 86 and the second encoder pulley 83 have the same specifications, the second encoder pulley 83 rotates at the same speed as the first encoder pulley 86. A timing belt may be used as the encoder belt 87.

When the third friction wheel 50 rotates, the first encoder pulley 86 rotates. When the first encoder pulley 86 rotates, the second encoder pulley 83 is rotated by the encoder belt 87. When the second encoder pulley 83 rotates, the encoder shaft 81 rotates integrally with the second encoder pulley 83. Then, the roll output encoder 80 may detect the rotation of the encoder shaft 81. As described above, because the encoder shaft 81 rotates at the same speed as the third friction wheel 50, the roll output encoder 80 may detect the rotation angle of the third friction wheel 50.

In this embodiment, magnetic encoders are used as the pitch output encoder 70 and the roll output encoder 80. However, the pitch output encoder 70 and the roll output encoder 80 are not limited thereto. As another example, although not illustrated, optical encoders may be used as the pitch output encoder 70 and the roll output encoder 80.

A first driver may be formed to rotate the first friction wheel 30. The first driver may include a first motor 91, a first encoder 93, and a first power transmitter 95.

The first motor 91 is disposed on the frame 110 and generates rotational force for rotating the first friction wheel 30. The first motor 91 is disposed at a predetermined distance from the first friction wheel 30. A motor shaft 91a of the first motor 91 and the first shaft 10 may be disposed in parallel to each other. A servo motor may be used as the first motor 91.

The first encoder 93 is configured to detect the rotation angle of the first motor 91. In other words, the first encoder 93 is configured to output a signal corresponding to the rotation of the motor shaft 91a of the first motor 91. A magnetic encoder may be used as the first encoder 93.

The first power transmitter 95 is configured to transmit the rotational force of the first motor 91 to the first friction wheel 30. The first power transmitter 95 may include a first gear power transmitter 951 and a first belt power transmitter 955.

Referring to FIG. 2, the first gear power transmitter 951 may include a first pinion 952 disposed on the motor shaft 91a of the first motor 91 and a first gear 953 meshing with the first pinion 952. The first gear 953 may be disposed to rotate around a fixed shaft disposed in the frame 110. The first gear 953 may be formed as a spur gear. The first gear 953 may have more teeth than the number of teeth of the first pinion 952 to decelerate the rotation of the first motor 91.

The first belt power transmitter 955 may include a first pulley 956 integrally provided with the first gear 953, a second pulley 957 integrally provided with the first friction wheel 30, and a first belt 958 connecting the first pulley 956 and the second pulley 957.

The first pulley 956 is integrally formed coaxially with the first gear 953, so that when the first gear 953 rotates, the first pulley 956 may rotate integrally with the first gear 953.

The second pulley 957 is integrally formed coaxially with the first friction wheel 30. Therefore, when the second pulley 957 rotates, the first friction wheel 30 may rotate with respect to the first shaft 10.

The first belt 958 may be formed to connect the first pulley 956 and the second pulley 957 to transmit the rotation of the first pulley 956 to the second pulley 957. A timing belt may be used as the first belt 958.

Because the first pulley 956 and the second pulley 957 are connected by the first belt 958, when the first pulley 956 rotates by the first gear 953, the second pulley 957 rotates, so that the first friction wheel 30 rotates.

Therefore, the rotational force of the first motor 91 may be transmitted to the first friction wheel 30 through the first gear power transmitter 951 and the first belt power transmitter 955 of the first power transmitter 95.

A second driver may be formed to rotate the second friction wheel 40. The second driver may include a second motor 92, a second encoder 94, and a second power transmitter 96.

The second motor 92 is disposed on the frame 110 and generates rotational force for rotating the second friction wheel 40. The second motor 92 may be disposed on the frame 110 to face the first motor 91. The second motor 92 is disposed at a predetermined distance from the second friction wheel 40. A motor shaft 92a of the second motor 92 and the first shaft 10 may be disposed in parallel to each other. A servo motor may be used as the second motor 92.

The second encoder 94 is configured to detect the rotation angle of the second motor 92. In other words, the second encoder 94 is configured to output a signal corresponding to the rotation of the motor shaft 92a of the second motor 92. A magnetic encoder may be used as the second encoder 94.

The second power transmitter 96 is configured to transmit the rotational force of the second motor 92 to the second friction wheel 40. The second power transmitter 96 may include a second gear power transmitter 961 and a second belt power transmitter 965.

Referring to FIG. 2, the second gear power transmitter 961 may include a second pinion 962 disposed on the motor shaft 92a of the second motor 92 and a second gear 963 meshing with the second pinion 962. The second gear 963 may be disposed to rotate around a fixed shaft disposed in the frame 110. The second gear 963 may be formed as a spur gear. The second gear 963 may have more teeth than the number of teeth of the second pinion 962 to decelerate the rotation of the second motor 92.

The second belt power transmitter 965 may include a third pulley 966 integrally provided with the second gear 963, a fourth pulley 967 integrally provided with the second friction wheel 40, and a second belt 968 connecting the third pulley 966 and the fourth pulley 967.

The third pulley 966 is integrally formed coaxially with the second gear 963, so that when the second gear 963 rotates, the third pulley 966 may rotate integrally with the second gear 963.

The fourth pulley 967 is integrally formed coaxially with the second friction wheel 40, so that when the fourth pulley 967 rotates, the second friction wheel 40 may rotate with respect to the first shaft 10.

The second belt 968 may be formed to connect the third pulley 966 and the fourth pulley 967 to transmit the rotation of the third pulley 966 to the fourth pulley 967. A timing belt may be used as the second belt 968.

Because the third pulley 966 and the fourth pulley 967 are connected by the second belt 968, when the third pulley 966 rotates by the second gear 963, the fourth pulley 967 rotates, so that the second friction wheel 40 rotates.

Therefore, the rotational force of the second motor 92 may be transmitted to the second friction wheel 40 through the second gear power transmitter 961 and the second belt power transmitter 965 of the second power transmitter 96.

The structures of the first power transmitter 95 and the second power transmitter 96 as described above are an example, and the structure of the power transmitter is not limited thereto. The power transmitter may be implemented in various structures as long as it can rotate the first friction wheel 30 and the second friction wheel 40 by transmitting the rotational force of each of the first motor 91 and the second motor 92.

Referring to FIG. 5, the differential joint device 1 for a robot may include a first friction force adjuster 34 and a second friction force adjuster 44.

The first friction force adjuster 34 may be configured to adjust the frictional force between the first friction wheel 30 and the third friction wheel 50. The first friction force adjuster 34 may include a first pressing member 35, a first screw part 13, and a first adjusting nut 36.

The first pressing member 35 is inserted into the first shaft 10 and is disposed to press the first friction wheel 30 toward the third friction wheel 50. The first pressing member 35 may be provided to press the inner ring of the first bearing 32 disposed on the first shaft 10. Because the outer ring of the first bearing 32 is fixed to the first friction wheel 30, when the first pressing member 35 presses the inner ring of the first bearing 32, the first friction wheel 30 may be pressed toward the third friction wheel 50.

For example, the first pressing member 35 may be formed of a plurality of disc springs having a through hole in the center of the disc springs. In the embodiment shown in FIG. 5, four disc springs are stacked in the form that concave sides of the disc springs face each other and both ends of the disc springs are convex. The disc springs are disposed so that the convex part of the disc springs is in contact with the inner ring of the first bearing 32.

The first screw part 13 may be formed on an outer circumferential surface of one end of the first shaft 10. The first screw part 13 may be formed so that the first adjusting nut 36 is fastened to the first screw part 13.

Accordingly, when the first adjusting nut 36 fastened to the first screw part 13 of the first shaft 10 is turned, the force applied by the first pressing member 35 to the first bearing 32 is changed. Therefore, the pressing force with which the first pressing member 35 presses the first friction wheel 30 is changed. In detail, when the first adjusting nut 36 fastened to the first screw part 13 is turned in one direction, the pressing force with which the first pressing member 35 presses the first friction wheel 30 may increase. When the first adjusting nut 36 is turned in the opposite direction, the pressing force with which the first pressing member 35 presses the first friction wheel 30 may decrease. Therefore, it is possible to adjust the frictional force between the first friction wheel 30 and the third friction wheel 50 using the first adjusting nut 36.

The second friction force adjuster 44 may be configured to adjust the frictional force between the second friction wheel 40 and the third friction wheel 50. The second friction force adjuster 44 may include a second pressing member 45, a second screw part 14, and a second adjusting nut 46.

The second pressing member 45 is inserted into the first shaft 10 and is disposed to press the second friction wheel 40 toward the third friction wheel 50. The second pressing member 45 may be provided to press the inner ring of the second bearing 42 disposed on the first shaft 10. Because the outer ring of the second bearing 42 is fixed to the second friction wheel 40, when the second pressing member 45 presses the inner ring of the second bearing 42, the second friction wheel 40 may be pressed toward the third friction wheel 50.

For example, the second pressing member 45 may be formed in the same way as the first pressing member 35 described above. In other words, the second pressing member 45 may be formed of a plurality of disc springs having a through hole in the center of the disc springs.

The second screw part 14 may be formed on an outer circumferential surface of the other end of the first shaft 10 opposite to the first screw part 13. The second screw part 14 may be formed so that the second adjusting nut 46 is fastened to the second screw part 14.

Accordingly, when the second adjusting nut 46 fastened to the second screw part 14 of the first shaft 10 is turned, the force applied by the second pressing member 45 to the second bearing 42 is changed. Therefore, the pressing force with which the second pressing member 45 presses the second friction wheel 40 is changed. In detail, when the second adjusting nut 46 is turned in one direction, the pressing force with which the second pressing member 45 presses the second friction wheel 40 may increase. When the second adjusting nut 46 is turned in the opposite direction, the pressing force with which the second pressing member 45 presses the second friction wheel 40 may decrease. Therefore, the frictional force between the second friction wheel 40 and the third friction wheel 50 may be adjusted using the second adjusting nut 46.

The frame 110 is formed to support the first shaft 10, the first driver, and the second driver. The frame 110 is proved with a first support part 111 and a second support part 112 spaced apart by a predetermined distance and facing each other at one end of the frame 110. A first through hole 111a and a second through hole 112a through which both ends of the first shaft 10 are exposed are formed in the first support part 111 and the second support part 112, respectively.

A first motor fixing portion 113 spaced apart from the first through hole 111a of the first support part 111 by a predetermined distance may be provided on one side surface of the frame 110. The first motor 91 of the first driver may be fixed to the first motor fixing portion 113. A second motor fixing portion 114 spaced apart from the second through hole 112a of the second support part 112 by a predetermined distance may be provided on the opposite side surface of the frame 110. The second motor 92 of the second driver may be fixed to the second motor fixing portion 114.

Figure 7:
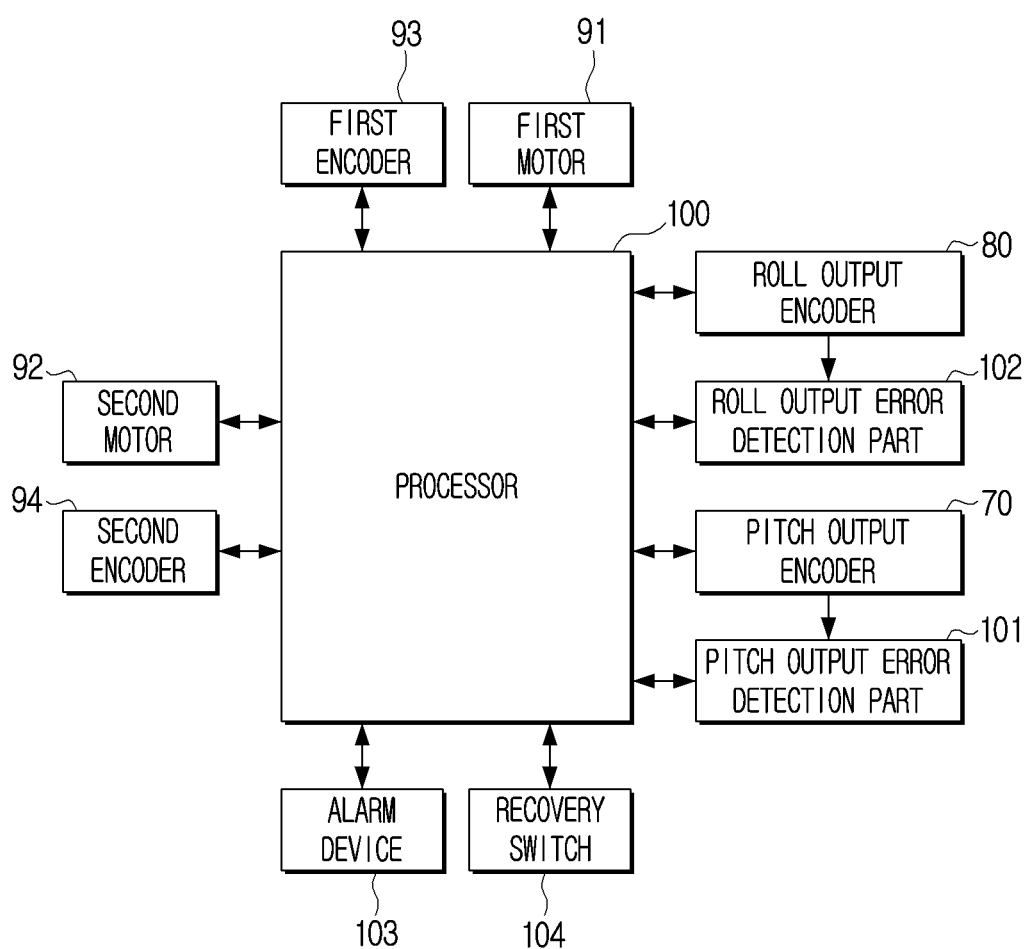
FIG. 7 is a functional block diagram of a differential joint device for a robot according to an embodiment of the disclosure.

FIG. 7 is a functional block diagram of a differential joint device for a robot according to an embodiment of the disclosure.

Referring to FIG. 7, the differential joint device 1 for a robot according to an embodiment of the disclosure may include the processor 100 configured to control the first motor 91 and the second motor 92. The processor 100 may control the first motor 91 and the second motor 92 through a servo controller.

The processor 100 is electrically connected to the first encoder 93 provided in the first motor 91 and the second encoder 94 provided in the second motor 92, so that the processor 100 may receive a signal from each of the first encoder 93 and the second encoder 94. Accordingly, the processor 100 may identify a rotation angle of each of the first motor 91 and the second motor 92 from signals received from the first encoder 93 and the second encoder 94.

The processor 100 is electrically connected to the pitch output encoder 70 and is configured to receive a signal from the pitch output encoder 70. Therefore, the processor 100 may identify a pitch rotation angle of the third friction wheel 50, that is, the connection plate 53 fixed to the third friction wheel 50, from the signal received from the pitch output encoder 70.

In addition, the processor 100 may be electrically connected to a pitch output error detection part 101. The pitch output error detection part 101 may be configured to compare an actual output value of the pitch output encoder 70 with an expected output value of the pitch output encoder 70. For example, the pitch output error detection part 101 may be configured to identify a difference value between the actual output value and the expected output value of the pitch output encoder 70 and transmit the identified difference value to the processor 100.

Here, the actual output value of the pitch output encoder 70 refers to the rotation angle identified by the processor 100 from the signal received from the pitch output encoder 70. In addition, the expected output value of the pitch output encoder 70 refers to a value calculated by the following formula.

Expected output value of the pitch output encoder=½×reduction ratio×(rotation angle of the first encoder+rotation angle of the second encoder)

Here, the reduction ratio refers to the reduction ratio of the first power transmitter 95 that transmits the rotation of the first motor 91 to the first friction wheel 30 or the reduction ratio of the second power transmitter 96 that transmits the rotation of the second motor 92 to the second friction wheel 40. The reduction ratio of the first power transmitter 95 may be the same as the reduction ratio of the second power transmitter 96.

The expected output value of the pitch output encoder 70 may be identified by the processor 100.

In addition, the processor 100 may be configured to output an alarm to the outside when the difference value between the actual output value of the pitch output encoder 70 and the expected output value of the pitch output encoder 70 is greater than or equal to a reference error, that is, a pitch reference error.

The processor 100 is electrically connected to the roll output encoder 80 and is configured to receive a signal from the roll output encoder 80. Therefore, the processor 100 may identify a roll rotation angle of the third friction wheel 50, that is, the connection plate 53 fixed to the third friction wheel 50, from the signal received from the roll output encoder 80.

In addition, the processor 100 may be electrically connected to a roll output error detection part 102. The roll output error detection part 102 may be configured to compare an actual output value of the roll output encoder 80 with an expected output value of the roll output encoder 80. For example, the roll output error detection part 102 may be configured to identify a difference value between the actual output value and the expected output value of the roll output encoder 80 and transmit the identified difference value to the processor 100.

Here, the actual output value of the roll output encoder 80 refers to the rotation angle identified by the processor 100 from the signal received from the roll output encoder 80, and the expected output value of the roll output encoder 80 refers to a value calculated by the following formula.

Expected output value of the roll output encoder=½×friction wheel reduction ratio×reduction ratio×(rotation angle of the first encoder−rotation angle of the second encoder)

Here, the friction wheel reduction ratio refer to the reduction ratio (diameter ratio) of the first friction wheel 30 and the third friction wheel 50 or the reduction ratio (diameter ratio) of the second friction wheel 40 and the third friction wheel 50. The reduction ratio refers to the reduction ratio of the first power transmitter 95 that transmits the rotation of the first motor 91 to the first friction wheel 30 or the reduction ratio of the second power transmitter 96 that transmits the rotation of the second motor 92 to the second friction wheel 40.

The expected output value of the roll output encoder 80 may be identified by the processor 100.

In addition, the processor 100 may be configured to output an alarm to the outside when the difference value between the actual output value of the roll output encoder 80 and the expected output value of the roll output encoder 70 is greater than or equal to a reference error, that is, a roll reference error.

To this end, the processor 100 may be electrically connected to an alarm device 103 capable of outputting an alarm. A buzzer, a speaker, a display, a warning light, etc. may be used as the alarm device 103.

When an overload acts on the differential joint device 1 for a robot according to an embodiment of the disclosure, a slip may occur between the third friction wheel 50 and the first and second friction wheels 30 and 40. Then, the processor 100 may identify the slip of the third friction wheel 50 using the pitch output encoder 70 and the roll output encoder 80, and inform the outside of the slip occurrence through the alarm device 103.

When the connection plate 53 disposed on the third friction wheel 50 collides with an external object, the third friction wheel 50 may be overloaded. At this time, because the third friction wheel 50 has a structure that slides relative to the first and second friction wheels 30 and 40, the first, second, and third friction wheels 30, 40, and 50 may be not damaged due to the overload. In other words, when a load greater than the reference torque is applied to the third friction wheel 50, the third friction wheel 50 may slip relative to the first and second friction wheels 30 and 40 to perform the function of a torque limiter.

For example, when the pitch rotation of the third friction wheel 50 is caused by an overload, the processor 100 may detect the pitch rotation using the pitch output encoder 70 and the pitch output error detection part 101 and output an alarm. In addition, when the roll rotation of the third friction wheel 50 is caused by the overload, the processor 100 may detect the roll rotation using the roll output encoder 80 and the roll output error detection part 102 and output an alarm.

In addition, the processor 100 may be electrically connected to a recovery switch 104. The recovery switch 104 may be configured to output a recovery signal to the processor 100 by a user's manipulation.

When the recovery signal is input from the recovery switch 104, the processor 100 may recover the differential joint device 1 for a robot based on the actual output value of the pitch output encoder 70 and the actual output value of the roll output encoder 80.

As described above, the differential joint device 1 for a robot according to an embodiment of the disclosure is recovered or restored based on the pitch output encoder 70 and the roll output encoder 80, so unlike the torque limiter according to the related art, there is no need for mechanical restoration.

Hereinafter, the roll rotation and pitch rotation of the differential joint device 1 for a robot according to an embodiment of the disclosure will be described in detail with reference to FIGS. 8 and 9.

Figure 8:
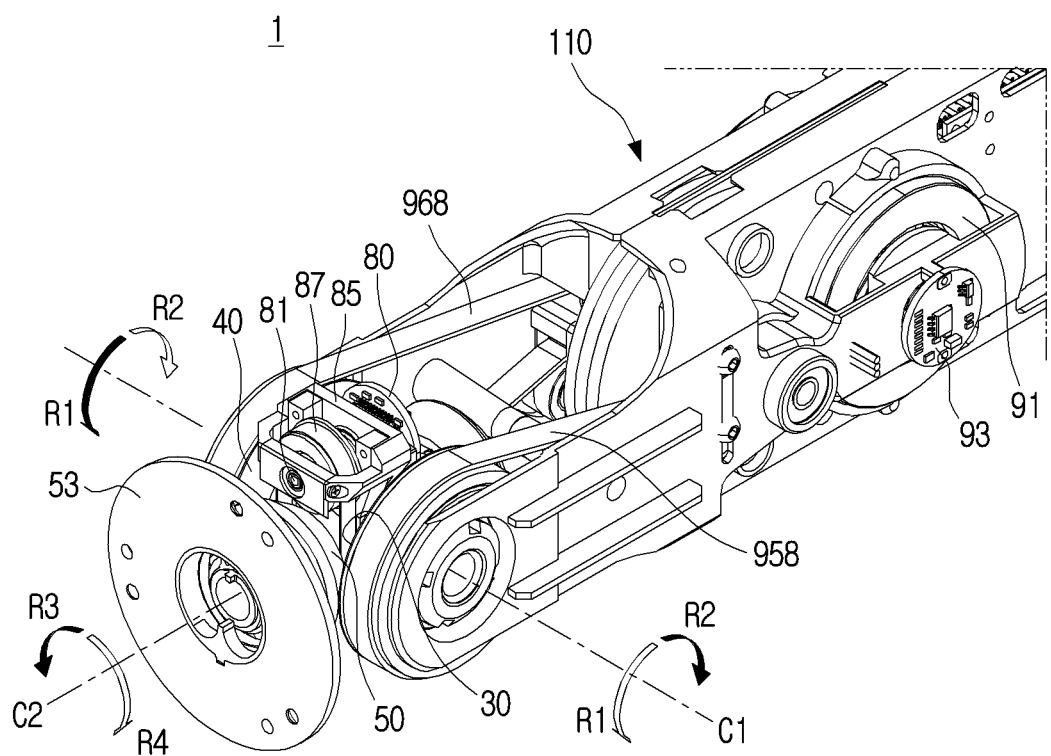
FIG. 8 is a view for explaining roll rotation of a third friction wheel of a differential joint device for a robot according to an embodiment of the disclosure.

FIG. 8 is a view for explaining roll rotation of a third friction wheel of a differential joint device for a robot according to an embodiment of the disclosure.

When the third friction wheel 50 performs roll rotation, the first friction wheel 30 and the second friction wheel 40 may rotate in opposite directions to each other with respect to the first shaft 10, that is, the central axis C1 of the first shaft 10.

For example, as illustrated in FIG. 8, when the first friction wheel 30 rotates in the R1 direction and the second friction wheel 40 rotates in the R2 direction, the third friction wheel 50 may rotate in the R4 direction around the second shaft 20, that is, based on the central axis C2 of the second shaft 20. At this time, the fourth friction wheel 60 may rotate in the R3 direction around the second shaft 20 opposite to the third friction wheel 50.

Conversely, when the first friction wheel 30 rotates in the R2 direction and the second friction wheel 40 rotates in the R1 direction, the third friction wheel 50 may rotate in the R3 direction around the second shaft 20. At this time, the fourth friction wheel 60 may rotate in the R4 direction around the second shaft 20 opposite to the third friction wheel 50.

In other words, when the first friction wheel 30 and the second friction wheel 40 rotate in opposite directions, the third friction wheel 50 may rotate around the second shaft 20, that is, perform roll rotation.

Figure 9:
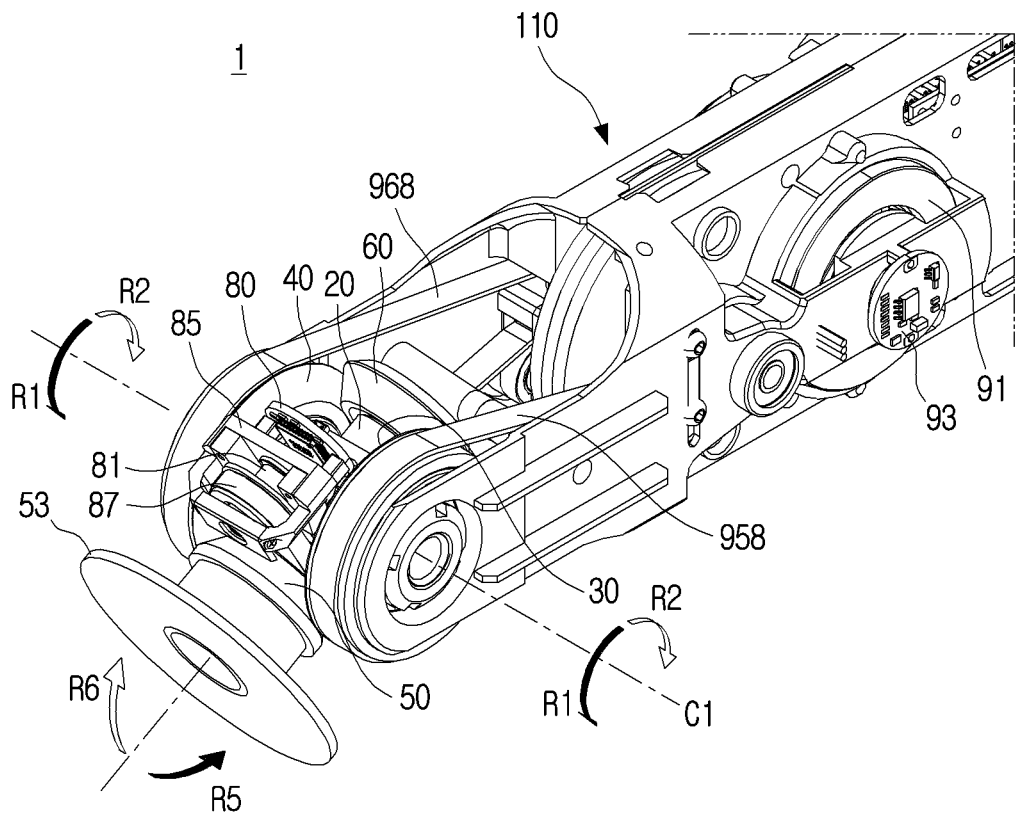
FIG. 9 is a view for explaining pitch rotation of a third friction wheel of a differential joint device for a robot according to an embodiment of the disclosure.

FIG. 9 is a view for explaining pitch rotation of a third friction wheel of a differential joint device for a robot according to an embodiment of the disclosure.

When the third friction wheel 50 performs pitch rotation, the first friction wheel 30 and the second friction wheel 40 may rotate in the same direction with respect to the first shaft 10, that is, the central axis C1 of the first shaft 10.

For example, as illustrated in FIG. 9, when both the first friction wheel 30 and the second friction wheel 40 rotate in the R1 direction, the third friction wheel 50 may rotate in the R5 direction around the first shaft 10, that is, around the central axis C1 of the first shaft 10. At this time, the fourth friction wheel 60 may rotate in the R5 direction around the first shaft 10 in the same way as the third friction wheel 50.

Conversely, when both the first friction wheel 30 and the second friction wheel 40 rotate in the R2 direction, the third friction wheel 50 may rotate in the R6 direction around the first shaft 10. At this time, the fourth friction wheel 60 may rotate in the R6 direction around the first shaft 10 in the same way as the third friction wheel 50.

In other words, when the first friction wheel 30 and the second friction wheel 40 rotate in the same direction with respect to the first shaft 10, the first shaft 10, the second shaft 20, the third friction wheel 50, and the fourth friction wheel 60 may rotate in the R5 direction or in the R6 direction around the central axis C1 of the first shaft 10.

Accordingly, when the first friction wheel 30 and the second friction wheel 40 rotate in the same direction, the third friction wheel 50 may perform pitch rotation around the first shaft 10.

Therefore, the third friction wheel 50 may passively perform pitch rotation or roll rotation based on the rotation directions of the first friction wheel 30 and the second friction wheel 40.

As described above, because the differential joint device 1 for a robot according to an embodiment of the disclosure may implement a torque limiter function using friction wheels and encoders, it is possible to prevent the differential joint device for a robot 1 from being damaged by an external force, or to prevent the differential joint device for a robot 1 from injuring a person or damaging an object.

In the above description, the roll output encoder 80 is disposed to detect the rotation of the encoder shaft 81 that is disposed parallel to the second shaft 20 and formed to rotate in the same way as the third friction wheel 50. However, the installation position of the roll output encoder 80 is not limited thereto.

Hereinafter, a differential joint device 1' for a robot according to an embodiment of the disclosure in which a roll output encoder is disposed in a different position will be described with reference to FIGS. 10 and 11.

Figure 10:
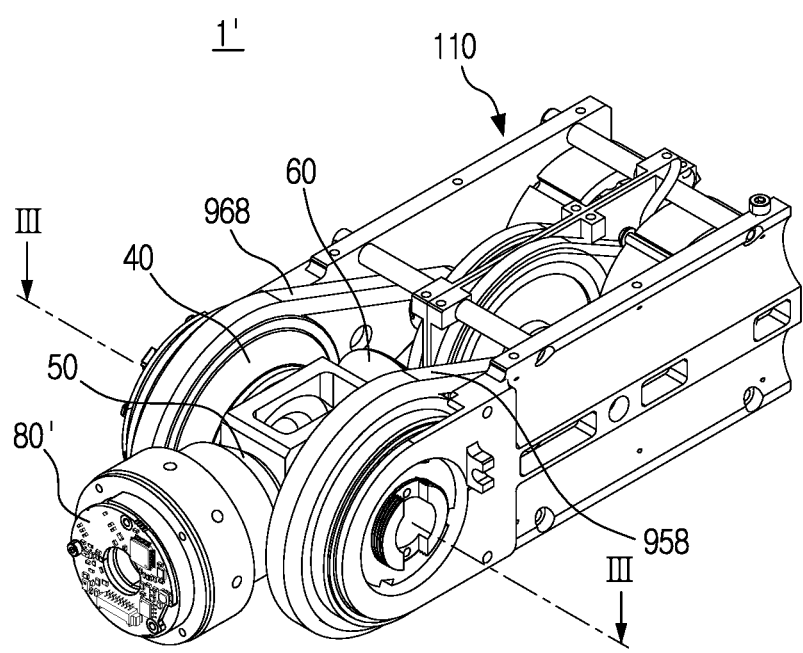
FIG. 10 is a perspective view illustrating a differential joint device for a robot according to an embodiment of the disclosure.

FIG. 10 is a perspective view illustrating a differential joint device for a robot according to an embodiment of the disclosure. FIG. 11 is a cross-sectional view illustrating the differential joint device for a robot of FIG. 10 taken along line III-III.

Figure 11:
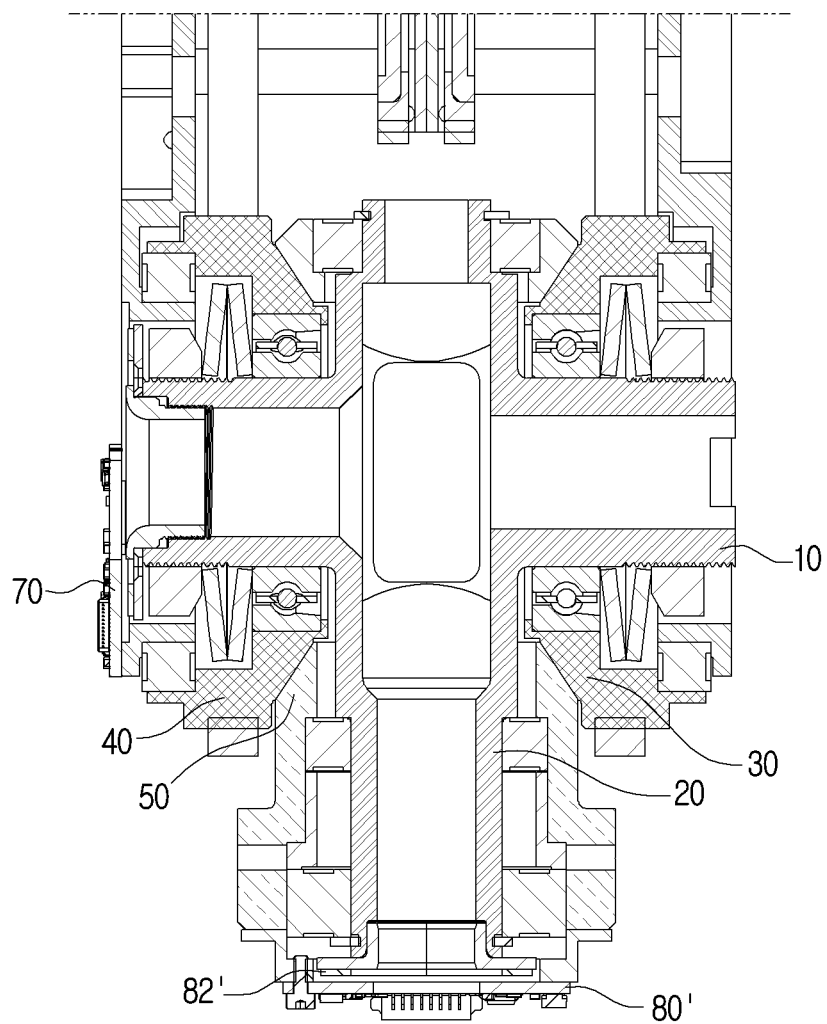
FIG. 11 is a cross-sectional view illustrating the differential joint device for a robot of FIG. 10 taken along line III-III.

Referring to FIGS. 10 and 11, a differential joint device 1' for a robot according to an embodiment of the disclosure may include a first shaft 10, a second shaft 20, a first friction wheel 30, a second friction wheel 40, a third friction wheel 50, a fourth friction wheel 60, a pitch output encoder 70, a roll output encoder 80', a first driver, and a second driver.

The first shaft 10, the second shaft 20, the first friction wheel 30, the second friction wheel 40, the third friction wheel 50, the fourth friction wheel 60, the pitch output encoder 70, the first driver, and the second driver are the same as or similar to those of the differential joint device 1 for a robot according to the above-described embodiment, and thus detailed descriptions thereof are omitted.

The roll output encoder 80' may be disposed to face one end of the second shaft 20 on which the third friction wheel 50 is disposed. The roll output encoder 80' may be fixed to the third friction wheel 50 and disposed to rotate integrally with the third friction wheel 50. The roll output encoder 80' may be formed as a donut-shaped disc.

A magnet 82' may be disposed at one end of the second shaft 20 facing the roll output encoder 80'. Therefore, the magnet 82' fixed to the second shaft 20 does not rotate when the third friction wheel 50 rotates around the second shaft 20. The magnet 82' may be formed in a donut-shaped disc.

A signal line and a power line may be connected to the roll output encoder 80' through the hollow 21 of the second shaft 20 and the hollow 11 of the first shaft 10.

The differential joint device 1' for a robot illustrated in FIGS. 10 and 11 is different from the roll output encoder 80 of the above-described differential joint device for a robot 1 only in the installation position of the roll output encoder 80'. Therefore, a detailed description thereof is omitted.

Hereinafter, a method for diagnosing a state of a differential joint device for a robot according to an embodiment of the disclosure will be described in detail with reference to FIG. 12.

Figure 12:
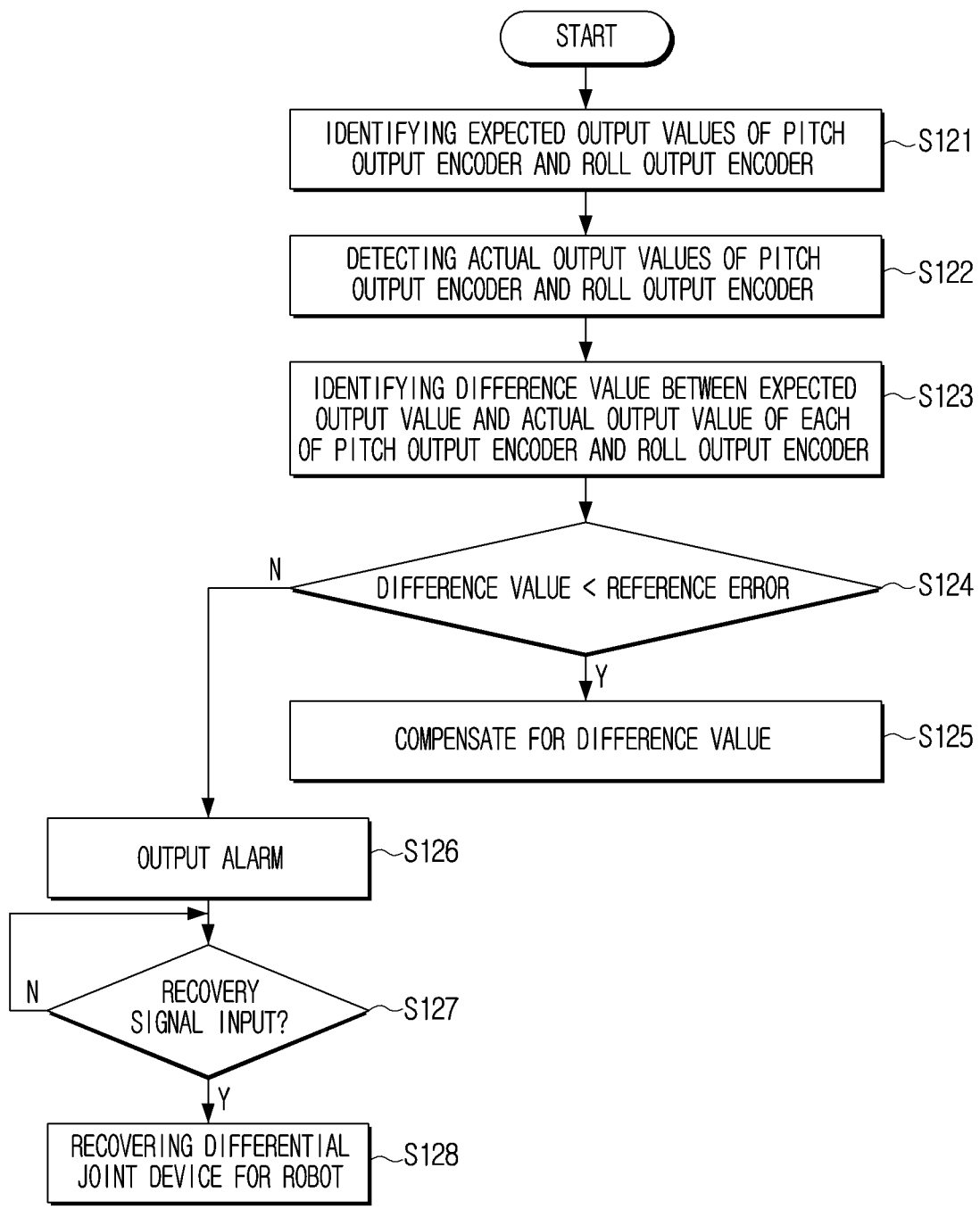
FIG. 12 is a flowchart for explaining a method for diagnosing a state of a differential joint device for a robot according to an embodiment of the disclosure.

FIG. 12 is a flowchart for explaining a method for diagnosing a state of a differential joint device for a robot according to an embodiment of the disclosure.

First, the processor 100 identifies an expected output value of the pitch output encoder 70 and an expected output value of the roll output encoder 80 (S121).

At this time, the processor 100 may identify the expected output value of the pitch output encoder 70 using rotation angle of the first encoder 93 and the rotation angle of the second encoder 94. In other words, the processor 100 may identify the expected output value of the pitch output encoder 70 using the following formula.

> Expected output value of the pitch output encoder=½×reduction ratio×(rotation angle of the first encoder+rotation angle of the second encoder)

In addition, the processor 100 may identify the expected output value of the roll output encoder 80 using the rotation angle of the first encoder 93 and the rotation angle of the second encoder 94. In other words, the processor 100 may identify the expected output value of the roll output encoder 80 using the following formula.

> Expected output value of the roll output encoder=½×friction wheel reduction ratio×reduction ratio×(rotation angle of the first encoder−rotation angle of the second encoder)

Next, the processor 100 detects an actual output value of the pitch output encoder 70 and an actual output value of the roll output encoder 80 (S122).

At this time, the processor 100 may identify the actual output value of the pitch output encoder 70, that is, an actual rotation angle of the pitch output encoder 70, using a signal received from the pitch output encoder 70.

In addition, the processor 100 may identify the actual output value of the roll output encoder 80, that is, an actual rotation angle of the roll output encoder 80, using a signal received from the roll output encoder 80.

Then, the processor 100 identifies a difference value between the expected output value and the actual output value of the pitch output encoder 70 and a difference value between the expected output value and the actual output value of the roll output encoder 80 (S123).

At this time, the processor 100 may identify the difference value between the expected output value and the actual output value of the pitch output encoder 70 using the pitch output error detection part 101. In addition, the processor 100 may identify the difference value between the expected output value and the actual output value of the roll output encoder 80 using the roll output error detection part 102.

Next, the processor 100 compares the difference value of the pitch output encoder 70 and the difference value of the roll output encoder 80 with reference errors, respectively (S124).

In detail, the processor 100 identifies whether the difference value of the pitch output encoder 70 is smaller than a reference error, that is, a pitch reference error. Also, the processor 100 identifies whether the difference value of the roll output encoder 80 is smaller than a reference error, that is, a roll reference error.

Subsequently, when the difference value of the pitch output encoder 70 and the difference value of the roll output encoder 80 are smaller than the reference errors, the processor 100 controls the first motor 91 with the first encoder 93 and the second motor 92 with the second encoder 94 to compensate for the difference value (S125).

In detail, when the difference value of the pitch output encoder 70 is smaller than the reference error, that is, the pitch reference error, the processor 100 controls the first motor 91 and the second motor 92 to compensate for the difference value of the pitch output encoder 70. In other words, the processor 100 operates the first motor 91 and the second motor 92 so that the expected output value of the pitch output encoder 70 coincides with the actual output value of the pitch output encoder 70.

In addition, when the difference value of the roll output encoder 80 is smaller than the reference error, that is, the roll reference error, the processor 100 controls the first motor 91 and the second motor 92 to compensate for the difference value of the roll output encoder 80. In other words, the processor 100 operates the first motor 91 and the second motor 92 so that the expected output value of the roll output encoder 80 coincides with the actual output value of the roll output encoder 80.

On the other hand, when at least one of the difference value of the pitch output encoder 70 and the difference value of the roll output encoder 80 is equal to or greater than the reference error, the processor 100 outputs an alarm (S126). In this case, the processor 100 may output an alarm using the alarm device 103.

After the alarm is output, the processor 100 identifies whether a recovery signal is input (S127).

In detail, when the alarm is output, the user checks the differential joint device 1 for a robot to see whether there is any damage. When there is no damaged part, the user presses the recovery switch 104. When the recovery switch 104 is pressed, a recovery signal may be input to the processor 100.

Finally, when the recovery signal is input, the processor 100 recovers the position of the differential joint device 1 for a robot based on the output value of the pitch output encoder 70 and the output value of the roll output encoder 80 (S128).

A differential joint device for a robot according to an embodiment of the disclosure having the above-described structure may implement a torque limiter function using a friction wheel and an encoder. Therefore, it is possible to prevent the differential joint device for a robot from being damaged by an external force, or the differential joint device for a robot from injuring a person or damaging an object.

In the above, preferred embodiments of the disclosure have been illustrated and described, but the disclosure is not limited the specific embodiments described above. Without departing from the gist of the disclosure claimed in the claims, anyone with ordinary knowledge in the art to which the disclosure pertains can make various modifications, of course, and such changes will fall within the scope of the claims.

What is claimed is:

1. A differential joint device for a robot, the differential joint device comprising:
   a first shaft extending in a first direction;
   a second shaft connected to the first shaft and extending in a second direction vertical to the first direction;
   a first friction wheel rotatably disposed on one side of the first shaft;
   a second friction wheel rotatably disposed on another side of the first shaft;
   a third friction wheel rotatably disposed at one end of the second shaft, wherein the third friction wheel is in contact with the first friction wheel and the second friction wheel;
   a pitch output encoder disposed to detect a rotation angle of the first shaft;
   a roll output encoder disposed to detect a rotation angle of the third friction wheel;
   a first driver configured to rotate the first friction wheel; and
   a second driver configured to rotate the second friction wheel.

2. The differential joint device of claim 1, wherein the first driver comprises:
   a first motor;
   a first encoder configured to detect a rotation angle of the first motor; and
   a first power transmitter configured to transmit rotation of the first motor to the first friction wheel, and
   wherein the second driver comprises:
   a second motor;
   a second encoder configured to detect a rotation angle of the second motor; and
   a second power transmitter configured to transmit rotation of the second motor to the second friction wheel.

3. The differential joint device of claim 2, wherein each of the first power transmitter and the second power transmitter comprises a gear power transmitter and a belt power transmitter.

4. The differential joint device of claim 2, further comprising a pitch output error detection part configured to identify a difference value between an actual output value of the pitch output encoder and an expected output value of the pitch output encoder.

5. The differential joint device of claim 4, wherein the expected output value of the pitch output encoder is calculated by a following formula:

$$\text{the expected output value of the pitch output encoder} = \tfrac{1}{2} \times \text{reduction ratio} \times (\text{rotation angle of the first encoder} + \text{rotation angle of the second encoder}).$$

6. The differential joint device of claim 4, further comprising:
   a processor configured to identify the expected output value of the pitch output encoder,
   wherein the processor is further configured to output an alarm to an outside based on the difference value between the actual output value of the pitch output encoder and the expected output value of the pitch output encoder exceeding a pitch reference error.

7. The differential joint device of claim 2, further comprising a roll output error detection part configured to calculate a difference value between an actual output value of the roll output encoder and an expected output value of the roll output encoder.

8. The differential joint device of claim 7, wherein the expected output value of the roll output encoder is calculated by a following formula:

$$\text{the expected output value of the roll output encoder} = \tfrac{1}{2} \times \text{friction wheel reduction ratio} \times \text{reduction ratio} \times (\text{rotation angle of the first encoder} - \text{rotation angle of the second encoder}).$$

9. The differential joint device of claim 7, further comprising:
   a processor configured to identify the expected output value of the roll output encoder,
   wherein the processor is further configured to output an alarm to an outside based on the difference value between the actual output value of the roll output encoder and the expected output value of the roll output encoder exceeding a roll reference error.

10. The differential joint device of claim 1, wherein each of the first friction wheel, the second friction wheel, and the third friction wheel is formed as a cone friction wheel.

11. The differential joint device of claim 1, further comprising:
    an encoder shaft disposed in parallel with the second shaft and formed to rotate in the same manner as the third friction wheel,
    wherein the roll output encoder is disposed to detect a rotation angle of the encoder shaft.

12. The differential joint device of claim 11, further comprising:
    a first encoder pulley disposed at one end of the third friction wheel facing the first shaft;
    a second encoder pulley disposed at one end of the encoder shaft;
    an encoder belt disposed to transmit rotation of the first encoder pulley to the second encoder pulley; and
    a magnet disposed on another end of the encoder shaft.

13. The differential joint device of claim 1, further comprising:
    a first friction force adjuster configured to adjust a frictional force between the first friction wheel and the third friction wheel; and
    a second friction force adjuster configured to adjust a frictional force between the second friction wheel and the third friction wheel.

14. The differential joint device of claim 13, wherein each of the first friction force adjuster and the second friction force adjuster comprises:
    a pressing member disposed at the first shaft and pressing the first friction wheel or the second friction wheel toward the third friction wheel;
    a screw part provided at one end of the first shaft; and
    an adjusting nut fastened to the screw part of the first shaft.

* * * * *